(12) United States Patent
Wait et al.

(10) Patent No.: US 10,173,703 B2
(45) Date of Patent: Jan. 8, 2019

(54) AUTOMATED SYSTEM FOR DETERMINING OPTIMAL TRAIN DRIVING SYSTEM PARAMETERS

(71) Applicant: NEW YORK AIR BRAKE, LLC, Watertown, NY (US)

(72) Inventors: Keith Wesley Wait, Flower Mound, TX (US); Bradley Howard, Haslet, TX (US); Devon Robert Hall, Irving, TX (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 38 days.

(21) Appl. No.: 15/223,084

(22) Filed: Jul. 29, 2016

(65) Prior Publication Data
US 2018/0029620 A1 Feb. 1, 2018

(51) Int. Cl.
*B61L 27/00* (2006.01)
*B61L 3/00* (2006.01)
(Continued)

(52) U.S. Cl.
CPC .......... *B61L 27/0027* (2013.01); *B61L 3/006* (2013.01); *B61L 27/0016* (2013.01);
(Continued)

(58) Field of Classification Search
CPC ........ G06F 7/00; G06F 19/00; G06F 11/0748; G06F 11/0793; G06F 11/2294; G06F 11/3006; G06F 11/3058; G06F 11/3447; G06F 11/3072; B61L 3/006; B61L 15/0072; B61L 27/00; B61L 27/0027; B61L 25/02; B61L 27/0016; B61L 27/0055; B61L 27/0094; B61C 17/12; B61C 3/00; B61C 17/02; G05D 1/02; F02D 41/3809;
(Continued)

(56) References Cited

U.S. PATENT DOCUMENTS 5,983,144 A 11/1999 Bonissone et al.
6,332,106 B1 12/2001 Hawthorne et al.
(Continued)

OTHER PUBLICATIONS

International Search Report and Written Opinion Form PCT/ISA/220, International Application No. PCT/US2016/044707, p. 1-11 International filing Date Jul. 29, 2016, dated Apr. 25, 2017.

*Primary Examiner* — Behrang Badii
(74) *Attorney, Agent, or Firm* — Bond Schoeneck & King, PLLC; David Nocilly

(57) ABSTRACT

A system for optimizing the control of a train that includes an interface for receiving data representing a set of operational parameters for a train that will traverse a predetermined route. A server is interconnected to the interface and programmed to generate a plurality of scenarios using the same set of operational parameters but different control parameters. A simulator is programmed to perform a simulation of the operation of the train as described by the operation parameters and control parameters. The server is programmed to review the results of the simulation and score how closely the simulations achieved one or more performance metrics, thereby identifying which control parameters should be used by the train and allowing the control parameters to be transmitted to the train.

8 Claims, 3 Drawing Sheets

Figure 1:
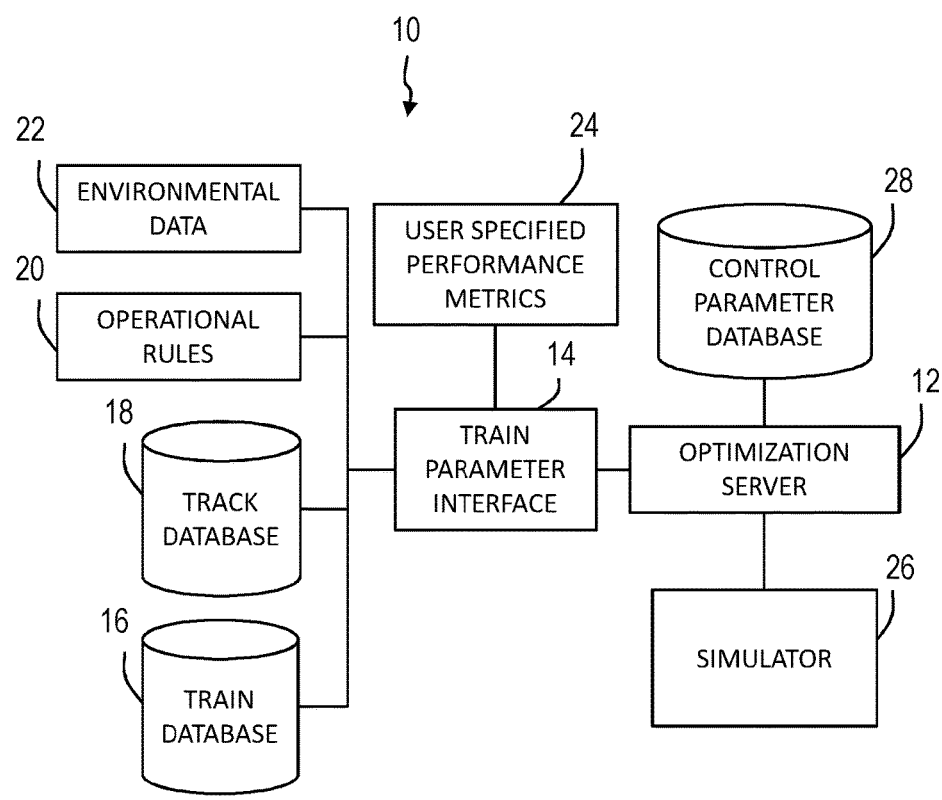

(51) Int. Cl.
 *G06F 7/00* (2006.01)
 *G06F 19/00* (2018.01)
 *B61L 15/00* (2006.01)
(52) U.S. Cl.
 CPC ....... *B61L 27/0055* (2013.01); *B61L 15/0072* (2013.01); *B61L 27/00* (2013.01); *G06F 7/00* (2013.01); *G06F 19/00* (2013.01)
(58) Field of Classification Search
 CPC . F02D 41/3836; F02D 41/402; F02M 47/027; F02M 57/005; G01M 15/09; F16H 61/0213; E02F 9/2079; G06N 99/005
 See application file for complete search history.

(56) References Cited

U.S. PATENT DOCUMENTS

| | | | |
|---|---|---|---|
| 2004/0133315 A1* | 7/2004 | Kumar | B61L 27/0027 700/302 |
| 2010/0161810 A1* | 6/2010 | Vaidyanathan | G06F 11/3006 709/228 |
| 2011/0118914 A1* | 5/2011 | Brooks | B61L 3/006 701/20 |
| 2012/0226422 A1* | 9/2012 | Jacobson | F16H 61/0213 701/58 |
| 2013/0239845 A1* | 9/2013 | Frazier | B61C 3/00 105/27 |
| 2014/0263861 A1* | 9/2014 | Pritchard | B61C 17/12 246/187 R |
| 2014/0288734 A1 | 9/2014 | Hawthorne et al. | |
| 2015/0149003 A1* | 5/2015 | Kupiec | B61C 17/12 701/19 |
| 2015/0379425 A1* | 12/2015 | Dirac | G06N 99/005 706/12 |
| 2015/0379427 A1* | 12/2015 | Dirac | G06N 99/005 706/12 |
| 2016/0078361 A1* | 3/2016 | Brueckner | G06N 99/005 706/12 |

* cited by examiner

AUTOMATED SYSTEM FOR DETERMINING OPTIMAL TRAIN DRIVING SYSTEM PARAMETERS

BACKGROUND OF THE INVENTION

1. Field of the Invention

The present invention relates to the parametric values of a control system for driving a train and, more specifically, to a system for determining optimal control system parameters.

2. Description of the Related Art

A common problem in the design of train control systems is the determination of parametric values of the train control system to achieve some goal or performance metric. In classic or textbook cases of control system design, a great deal of time is spent characterizing the system to be controlled (or plant) so that this determination is relatively straightforward. Oftentimes, in practice, the variation between two plants differs radically such that an alternative means of determining the control system parameters must be devised. The makeup of a train (with regards to gross weight, overall length, and the distribution of its weight along its length) can and does vary radically between any two individual specimens. Additionally, an individual train, when assembled, is intended to travel between two points along some pre-existing track. The profile of the route that is to be taken must also be taken into consideration when determining the control system parameters. Further, the performance metric for the train may be unique depending on the business needs of the operating railroad. For example, the operating railroad must weigh the opportunity cost of driving its locomotive faster (by way of increased fuel consumption) against the opportunity benefit of increased throughput on its rail network. Finally, external factors such as the weather can affect the operational performance of the locomotive. Due to the myriad factors which influence the performance and operational goals of a unique train, it is a non-trivial problem to determine the control system parameters for all possible trains, a sub-class of trains, or a unique individual train. Thus, there is a need in the art for a system that can determine a near-optimal set of control system parameters for a specified train on a specified route (on a specified date) while achieving a uniquely specified performance metric.

BRIEF SUMMARY OF THE INVENTION

The present invention is a system for optimizing the control of a train. The system includes an interface for receiving data representing a set of operational parameters for a train that will traverse a predetermined route. For example, the makeup of the locomotive consist, the cars in the train, and the track profile allow for modeling of train behavior that can be used according to the present invention to optimize the train control parameters. A server may be interconnected to the interface and programmed to generate a plurality of scenarios using the same set of operational parameters for each scenarios, but with a variable set of control parameters with each scenario so that the specific control parameters are unique to each the plurality of scenarios. A simulator is programmed to perform a simulation of the operation of the train as described by the operation parameters and the unique set of control parameters. The simulator may comprise multiple modules operating in parallel to expedite the processing of the simulations. The server is programmed to review the results of the simulation and score the scenarios based on how closely the resulting simulation achieved one or more predetermined performance metrics, thereby identifying which specific set of control parameters best achieved the performance metric. The system may prepare a second plurality of scenarios using the same set of operational parameters and a new variable set of control parameters that are variations of the control parameters whose resulting scenarios were scored highest. In order to account for error in the operation parameters, the system may generate a third plurality of scenarios using the same set of control parameters and variations of the set of operational parameters to see how errors will impact the achievement of the performance metric. The control parameters may be a default set or a previously stored set that were found to best achieve the performance metric under similar operational parameters.

The present invention includes a method of optimizing the control of a train that begins with the step of obtaining data representing a set of operational parameters for a train that will traverse a predetermined route. Next, a plurality of scenarios are generated using the same set of operational parameters for each of the plurality of scenarios and a set of control parameters that is unique to each the plurality of scenarios. The operation of the train is then simulated according to each of the plurality of scenarios and a determination made regarding which set of control parameters used in the plurality of scenarios best achieves a predetermined performance metric. The step of determining which set of control parameters best achieves the predetermined performance metric may comprise the step of scoring each of the plurality of scenarios according to how closely the predetermined performance metric is achieved. The step of determining which set of control parameters best achieves the predetermined performance metric may further comprise preparing a second plurality of scenarios using the same set of operational parameters and a second set of control parameters that are variations of the set of control parameters used in whichever of the first plurality of scenarios scored highest. A third plurality of scenarios may also be generated using the same set of control parameters for each along with variations of the set of operational parameters to determine how errors in the operational parameters will impact the achievement of the performance metric.

BRIEF DESCRIPTION OF THE SEVERAL VIEWS OF THE DRAWING(S)

Figure 2:
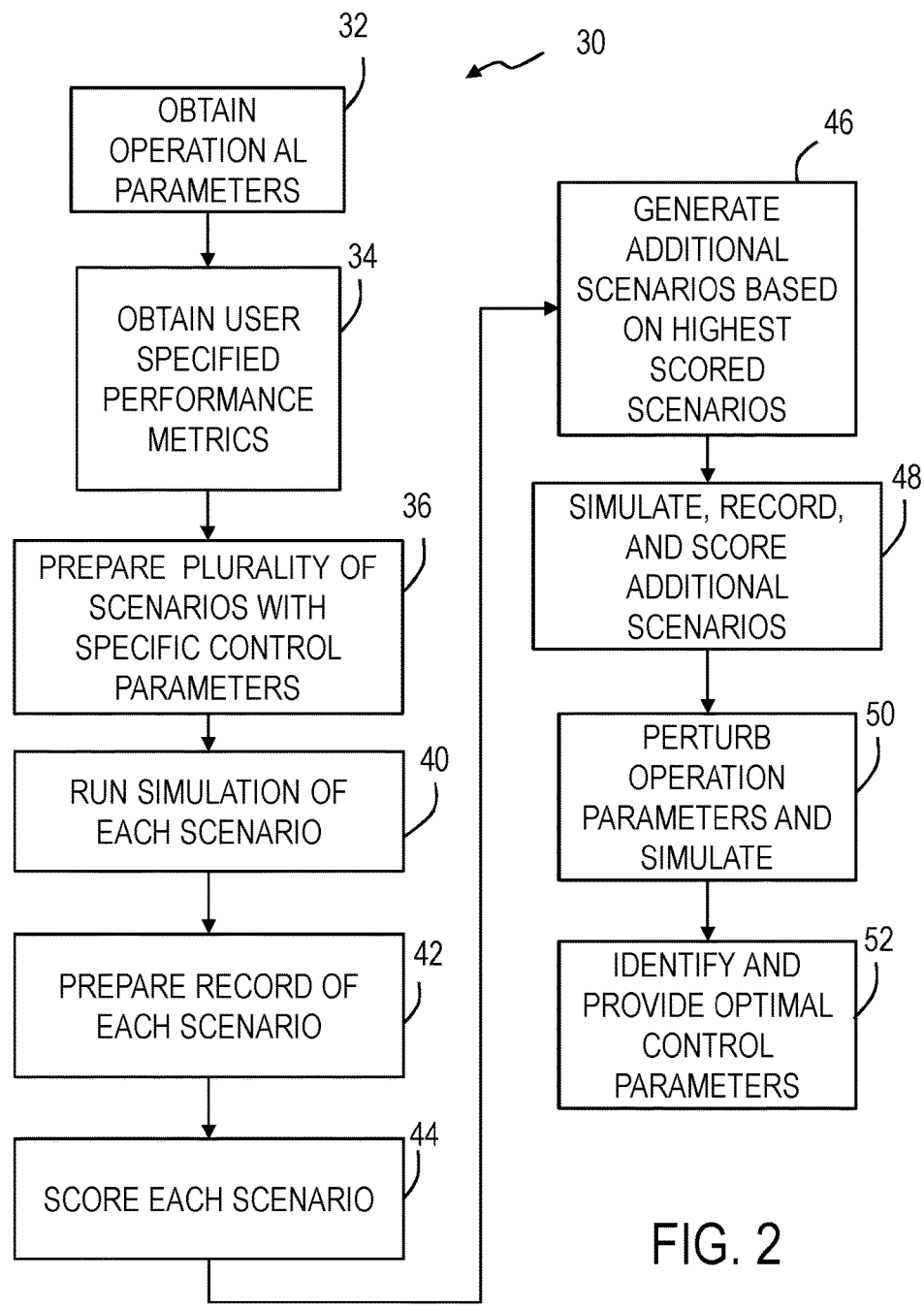
Figure 3:
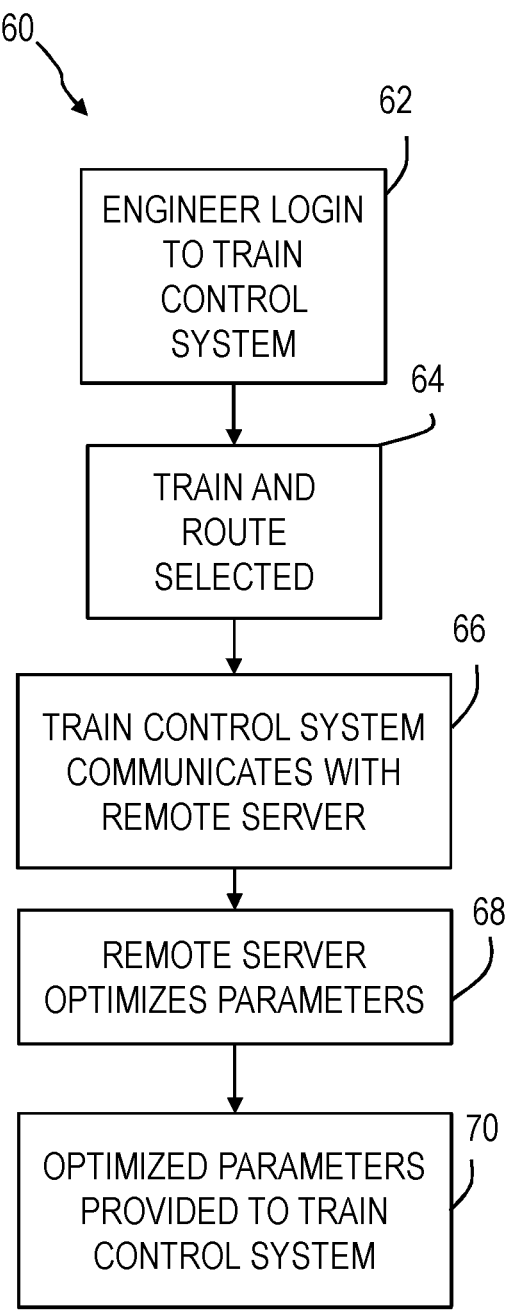

The present invention will be more fully understood and appreciated by reading the following Detailed Description in conjunction with the accompanying drawings, in which:

FIG. 1 is a schematic of a system for optimizing train control parameters according to the present invention; and FIG. 2 is a flowchart of a method for optimizing train control parameters according to the present invention; and FIG. 3 is a flowchart of a method for installing optimizing train control parameters on a lead locomotive according to the present invention.

DETAILED DESCRIPTION OF THE INVENTION

Referring to the figures, wherein like numerals refer to like parts throughout, there is seen in FIG. 1 a train control optimization system 10 for determining a set of control system parameters for a specified train on a specified route (on a specified date) while achieving a uniquely specified performance metric. System 10 comprises an optimization server 12 in communication with a train parameter interface 14. Interface 14 is used to provide server 12 with operational parameters that are used to determine how a train will perform when operated along a route, such as the makeup of the particular locomotive consist and railcars such as that typically stored in a conventional train database 16, the track profile containing grade, curvature and other geographic information such as that stored in a conventional track database 18, any railroad-specific operational rules 20 such as speed limits, and the like. Environmental data 22 such as a weather forecast may optionally be included. Interface 14 is also used to provide server 12 with the particular performance metrics 24 that the user of system 10 wishes to optimize over a route, such as fuel efficiency, arrival time, etc.

Server 12 is programmed to generate a plurality of simulation scenarios based on the operational parameters and the performance metrics provided by user interface 14. Preferably, each scenario is implemented using the common specified train and route data but with a unique set of control system parameters for each scenario that represent how the train is to be driven over the route. Control system parameters generally comprise the limits on changing the operation of the train from one state to another state. Control system parameters govern whether dynamic braking by one or more locomotives in the train can be increased or decreased, whether the rail car brakes can be applied or released, whether the locomotive throttle can be moved from one notch to another notch, etc. while complying with necessary standards of train operation over the given route, such as the particular speed restrictions in place on the given route or the acceptable level of in-train forces. Example limits include the minimum dynamic brake position before the air brakes can be applied, the simulation horizon time when changing the lead locomotive from dynamic brake to power, and the maximum allowed acceleration of a lead locomotive while remote locomotives are in dynamic brake. In most cases, a railroad will apply the same set of control system parameters across the entire system regardless of route. As a result, existing control system parameters are highly static and do not respond to operating conditions as in the case with the present invention as explained below.

A default set of control system parameters may be used as the basis for each scenario, with the default control system parameters varied in each scenario by perturbing each parameter by a small amount so that a Jacobian of the performance metric with respect to each of the control system parameters may be calculated. The collection of these decisions or choices in the driving of the train over the course of a particular route for a particular train in thus included in the scenario to be simulated. The underlying data and the perturbed control system parameters for each of the plurality of simulation scenarios may then be put into a queue by server 12 for performing a simulation of each simulation scenario. To the extent that there is a wide variation in control parameters that would comply with the standard of train operation, system 10 could be configured to narrow the possibilities to reduce the amount of computations to be performed.

System 10 further includes a simulator 26 that is in communication with server 12 and programmed to perform a simulation of the performance of the train along the route based on the operational parameters and the particular control system parameters for each simulation scenario. System 10 may thus be programmed to sequentially distribute the plurality of simulation scenarios to the simulator 26. System 12 may also comprise a plurality of simulators 26 to perform multiple simulations in parallel to increase the processing speed of system 10. Server 12 and simulators 26 may be implemented in separate computers that are remotely positioned from each other, or in a single computer device or virtually within a data center. Regardless of how many are used, simulator 26 is programmed to perform a simulation of train performance based on the operational parameters (consist makeup, track profile, railroad-specific operational rules, weather forecast, etc.) if the train were operated on the specified route according to the control system parameters assigned to the particular simulation scenario.

Simulator 26 is configured to prepare a record of the results of the simulation when it is completed and transmit the record to server 12. Server 12 is programmed to apply a score to the record of each simulation received from simulator 26. The score represents how close the simulation achieved the specified performance metrics specified by the user. For example, the specified performance metrics may be fuel efficiency and time of arrival. Other metrics such as compliance with railroad standard operating procedures or even management of in-train forces when air brakes may be applied may be used.

Server 12 is further programmed to aggregate the scores for each simulation scenario and, if needed, generate additional scenarios for further simulation that are derived from the scenarios that received the highest scores. For example, optimization approaches such as gradient descent, grid search, ant swarm, or similar algorithms may be used by server 12 to generate additional scenarios based on scenarios that were scored as best achieving the specified performance metrics. These additional scenarios are then added to the queue by server 12 for distribution to simulator 26 and then used to prepared additional simulation reports that can be scored by server 12. When the scored performances achieve the desired specified performance metrics (or reach a threshold level such that further changes to the control system parameters produce no appreciable gain in score), the control system parameters have been optimized. Server 12 may then slightly perturb the operational parameters while holding constant the optimized control system parameters. The approach is performed to ascertain the robustness of the optimal control parameters with regard to a predetermined amount of uncertainty in the train specifications. For example, server 12 may slightly increase or slightly decrease the gross weight of the train or the weight of individual cars such that the weight distribution of the train is altered from its originally reported state. This approach accounts for the uncertainty inherent in the measurements of the train and acknowledges the deficiencies of the simulation outcomes with respect to the actual train. Server 12 may further be programmed to make adjustments to the control system parameters to achieve better robustness to uncertainty and repeat the robustness experiments as needed depending on the outcome of these robustness simulations. Depending on time and/or computing restraints, however, server 12 may omit this process of maximizing robustness without departing from the spirit of the invention. At the conclusion of the simulation scoring and optional robustness evaluation, server 12 identifies the control system parameters that optimally achieve the desired performance with an adequate margin against uncertainty.

Train parameter interface 14 for providing train specifications may be configured to be accessible over a computer network such that it is available to the operator of a train (railroad). The interface for transmitting optimal parameters is such that the on-board computer of the controlling (or lead) locomotive of the subject train may receive the control system parameters that produced the desired result and integrate those parameters into its train control system 10.

Server 12 may be optionally associated with a control parameter database 28 that maps train parameter inputs (train consist, train route, etc. as defined above) to optimal control parameters. Server 12 may thus, when generating the initial simulation scenarios, search database 28 for and retrieve an initial set of control parameters based on a previously received set of inputs that is similar to the present set of inputs that can be used as the control parameter set for deriving the unique parameter sets in the simulation scenarios. This approach can accelerate the determination of optimal parameters by starting from what is likely to be closer to optimal control parameters for the provided inputs.

Server 12 is thus programmed to execute an optimization process 30 beginning with the step of obtaining all operational parameters 32. Next, user specified performance metrics are obtained 34. Server 12 may then prepare a plurality of scenarios with specific control parameters 36 that are varied among the plurality of scenarios. A simulation of each scenario is then run 40 to determine how the train, as described by the operational parameters, will perform when operated according to the control parameters. A record of each scenario is then prepared 40 and the records scored 44 according to the level of achievement relative to the user specified performance metrics obtained in step 34. Additional scenarios are then generated based on the highest scored scenarios 46 to optimize the control parameters that were scored in step 44 as most closely achieving the user specified performance metrics. The additional scenarios are simulated, recorded, and scored 48 to further optimize the control parameters. The operational parameters may optionally be perturbed and simulated 50 to determine whether potential errors in the operational parameters will impact the optimized control parameters. Finally, server 12 can identify the optimized control parameters and provide them for use by the operator of the train to achieve the specified performance metrics.

Referring to FIG. 3, system 10 may be implemented as part of a train startup process 60. For example, an engineer initially logging into the train control system of a lead locomotive of a train 62 prior to departing on a particular route triggers the use of system 10. In a conventional approach, the train control system communicates with a back office server and is provided with a control system parameter file that contains the predetermined driving instructions for the upcoming route based on information in train database 16 and track database 18. In the present invention, however, once the train and route have been selected 64, the remote server can implement process 30 to optimize the train driving parameters 68. Due to the processing power required to perform the steps of process 30, optimization may be performed remotely at a back office server with the resulting optimized parameters communicated to the train control system as an improved control system parameter file. Process 30 could also be implemented on the train, such as on a train control system or associated computer having sufficient computing resources for performing the simulations of the various scenarios as described herein. Regardless of where process 30 is implemented, the optimized train driving parameters are supplied to the train control system 70 for use by the engineer in more effectively achieved the predetermined goals for the train over the route (or for actually driving the train as would be the case with a positive train control (PTC) system).

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for optimizing the control of a train, comprising:

an interface for receiving data representing a set of operational parameters for a train that will traverse a predetermined route;

a server interconnected to interface that is programmed to generate a first scenario based on the set of operational parameters and a first set of control parameters and at least a second scenario based on the set of operational parameters and a second set of control parameters that are different than the first set of control parameters;

a simulator programmed to simulate the operation of the train traversing the predetermined route according to the first scenario and to simulate the operation of the train traversing the predetermined route according to the second scenario;

wherein the server is further programmed to select an optimal set of control parameters as whichever of the first set of control parameters and the second set of control parameters should be used to achieve the predetermined performance metric based on which of the first scenario and the second scenario best achieves a predetermined performance metric over the predetermined route;

wherein the server is programmed to provide the optimal set of control parameters to a train control system;

wherein the set of operational parameters includes a track profile and locomotive consist information;

wherein the simulator comprises a plurality of simulation module operating in parallel;

wherein the server is programmed to determine which of the first set of control parameters and the second set of control parameters should be used to achieve the predetermined performance metric by scoring each of the first scenario and the second scenario according to how closely the predetermined performance metric is achieved; and, wherein the server is programmed to determine which of the first set of control parameters and the second set of control parameters should be used to achieve the predetermined performance metric by preparing a first plurality of new scenarios using the set of operational parameters and a plurality of new sets of control parameters that are variations of the set of control parameters that were identified as best achieving the predetermined performance metric.

2. The system of claim 1, wherein the server is further programmed to generate a second plurality of new scenarios using the set of control parameters that were identified as best achieving the predetermined performance metric and a corresponding plurality of new sets of operational parameters that are variations of the set of operational parameters.

3. The system of claim 2, wherein the set of control parameters comprises a default set of control parameters stored in a database and retrievable by the server.

4. The system of claim 3, wherein the default set of control parameters is selected from a plurality of stored sets of parameters based on the set of operational parameters.

5. A method of optimizing the control of a train, comprising the steps of:
obtaining data representing a set of operational parameters for a train that will traverse a predetermined route;
generating a first scenario based on the set of operational parameters and a first set of control parameters and at least a second scenario based on the set of operational parameters and a second set of control parameters that are different than the first set of control parameters;
simulating the operation of the train traversing the predetermined route according to the first scenario: and—
simulating the operation of the train traversing the predetermined route according to the second scenario:
determining an optimal set of control parameters by selecting whichever of the first set of control parameters or the second set of control parameters best achieves a predetermined performance metric for the predetermined route based on which of the first scenario and the second scenario best achieves the predetermined performance metric for the predetermined route;
providing the optimal set of control parameters to a train control system for use;
wherein the step of determining which of the first set of control parameters or the second set of control parameters best achieves a predetermined performance metric comprises the step of scoring the first scenario and the second scenario according to how closely the predetermined performance metric is achieved; and,
preparing a first plurality of new scenarios using the set of operational parameters and a corresponding plurality of new sets of control parameters that are variations of the set of control parameters that was identified as best achieving the predetermined performance metric and determining which of the plurality of new sets of control parameters best achieves the predetermined performance metric.

6. The method of claim 5, further comprising the step of generating a second plurality of new scenarios using the new set of control parameters that was identified as best achieving the predetermined performance metric and a corresponding plurality of new sets of operational parameters that are variations of the set of operational parameters.

7. The method of claim 6, wherein the set of control parameters comprises a default set of control parameters.

8. The method of claim 7, wherein the default set of control parameters is selected from a plurality of stored sets of parameters based on the set of operational parameters.

* * * * *